United States Patent
Chou et al.

(10) Patent No.: US 9,417,733 B2
(45) Date of Patent: Aug. 16, 2016

(54) TOUCH METHOD AND TOUCH SYSTEM

(75) Inventors: Chia-Te Chou, New Taipei (TW); Shou-Te Wei, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 794 days.

(21) Appl. No.: 13/605,923

(22) Filed: Sep. 6, 2012

(65) Prior Publication Data
US 2013/0162600 A1    Jun. 27, 2013

(30) Foreign Application Priority Data
Dec. 21, 2011 (TW) .............................. 100147781 A (51) Int. Cl.
*G06F 3/041* (2006.01)
*G06F 3/042* (2006.01)
*G06F 3/0488* (2013.01)

(52) U.S. Cl.
CPC .......... *G06F 3/0421* (2013.01); *G06F 3/04883* (2013.01)

(58) Field of Classification Search
None
See application file for complete search history.

(56) References Cited

U.S. PATENT DOCUMENTS

| | | | |
|---|---|---|---|
| 6,236,037 B1* | 5/2001 | Asada ..................... | G01L 1/248 250/221 |
| 2007/0300182 A1* | 12/2007 | Bilow ......................... | 715/799 |
| 2009/0079700 A1* | 3/2009 | Abernathy ................... | 345/173 |
| 2010/0263946 A1* | 10/2010 | Miyazaki ............ | G06F 3/04883 178/2 R |
| 2010/0321309 A1 | 12/2010 | Lee et al. | |
| 2011/0134079 A1* | 6/2011 | Stark ..................... | G06F 3/0416 345/175 |

* cited by examiner

*Primary Examiner* — Nicholas Lee
(74) *Attorney, Agent, or Firm* — Muncy, Geissler, Olds & Lowe, P.C.

(57) ABSTRACT

A touch method and a touch system using the same are disclosed. The touch system comprises a display panel and an image sensing module. The touch method comprises the following steps: detecting and acquiring a coordinate position of a touch object entering a sensing region of the display panel; determining whether the touch object is moving or situated at a fixed point according to the coordinate position; sensing a first reflective luminance generated by the touch object at a point via the image sensing module; sensing a second reflective luminance generated by the touch object at the point via the image sensing module after a time period; comparing the first and the second reflective luminance; if the first reflective luminance is different from the second reflective luminance, then determining that the touch object is performing a fixed point rotation; executing a corresponding instruction according to the fixed point rotation.

12 Claims, 8 Drawing Sheets

TOUCH METHOD AND TOUCH SYSTEM

BACKGROUND OF THE INVENTION

1. Field of the Invention

The present invention relates to a touch method executing instructions according to touch gestures and a touch system using the same, and more particularly, to a touch method executing instructions according to a fixed-point finger rotation gesture and a touch system using the same.

2. Description of the Related Art

With the swift development of technology, various kinds of electronic devices with touch functions seem to be indispensable, such as the mobile phone, tablet PC or auto teller machine; the touch screen truly plays an important role. In order to meet user requirements and to provide convenience to users, many touch system manufacturers develop functions triggered by different gestures to facilitate operations of the electronic devices.

In a prior art touch system, there are some de-facto gestures and others defined by manufacturers. In general, one-finger touch gestures enable or initiate graphical user interface (GUI) elements by tapping at least once or by sliding on the touch screen, such as scrolling or dragging an object on the screen. On the other hand, multi-touch gestures or touch gestures using more than one finger are used for rotating a GUI element or a photo; for example, a multi-touch gesture can use two fingers to simultaneously touch the GUI element and then rotate the fingers clockwise or counterclockwise to let the GUI element rotate accordingly. One reason for using multi-touch gestures to rotate the GUI element is that traditional touch systems, such as resistive, capacitive, force sensing, or optical types of touch systems, cannot recognize a fixed point rotation; therefore, if a user rotates his/her finger at a fixed point, the traditional touch system assumes that the touch object (finger) stays at the same point without moving, so it reacts as if the finger does not rotate at that point. In other words, the traditional touch system cannot execute an instruction according to a fixed-point rotation gesture.

SUMMARY OF THE INVENTION

It is an object of the present invention to provide a touch method with a fixed-point rotation gesture.

It is another object of the present invention to provide a touch system which can sense a fixed-point rotation gesture.

In order to achieve the above objects, the present invention discloses a touch method of a fixed-point rotation gesture for use in conjunction with a touch system, wherein the touch system comprises a display panel and an image sensing module, the touch method comprising the following steps: detecting and acquiring a coordinate position of a touch object entering a sensing region of the display panel; determining whether the touch object is moving or situated at a fixed point according to the coordinate position; sensing a first reflective luminance generated by the touch object at a point via the image sensing module; sensing a second reflective luminance generated by the touch object at the point via the image sensing module after a time period; comparing the first and the second reflective luminance; if the first reflective luminance is different from the second reflective luminance, then determining that the touch object is performing a fixed point rotation; and executing a corresponding instruction according to the fixed point rotation.

According an embodiment of the present invention, the display panel comprises a display surface, and the image sensing module comprises a first image sensor and a second image sensor, wherein the first image sensor is disposed at an upper left portion of the display surface, and the second is disposed at an upper right portion of the display surface; the touch method further comprises the following steps: when the first image sensor senses a first luminance, sensing a third luminance generated by the touch object at the fixed point via the second image sensor; sensing a second luminance generated by the touch object at the fixed point via the first image sensor and a fourth luminance generated by the touch object at the fixed point via the second image sensor after a time period; comparing the first and the second reflective luminance, and also comparing the third and the fourth reflective luminance to determine a direction of a fixed point rotation of the touch object on the display surface. In an embodiment of the present invention, if the first luminance is lower than the third luminance, then comparing the first luminance and the second luminance to determine a direction of the fixed point rotation; otherwise, if the first luminance is higher than the third luminance, then comparing the third and the fourth luminance to determine a direction of the fixed point rotation. When comparing the second luminance and the first luminance to determine the direction of the fixed point rotation, if the second luminance is lower than the first luminance, then determining that the fixed-point rotation is performed in the clockwise direction; otherwise, if the second luminance is higher than the first luminance, then determining that the fixed-point rotation is performed in the counterclockwise direction. When comparing the fourth luminance and the second luminance to determine the direction of the fixed point rotation, if the fourth luminance is lower than the second luminance, then determining that the fixed-point rotation is performed in the counterclockwise direction; otherwise, if the fourth luminance is higher than the second luminance, then determining that the fixed-point rotation is performed in the clockwise direction. Then the touch method executes a corresponding instruction according to the fixed point rotation. Besides, according to the embodiment of the present invention, the instruction is used for controlling a trigger object on the display surface which is touched by the touch object, such that when the fixed-point rotation is clockwise, the trigger object rotates in the clockwise direction; otherwise, when the fixed-point rotation is counterclockwise, the trigger object rotates in the counterclockwise direction.

The present invention discloses a touch system for sensing a fixed-point rotate touch gesture. The touch system comprises a display panel, an image sensing module, a coordinate positioning module, a determining module, and a control module; the image sensing module detecting whether a touch object enters a sensing region of the display panel and acquiring a reflective image of the touch object, and the image sensing module obtaining a first luminance and then a second luminance after a time period respectively; the coordinate positioning module acquiring, on the display surface, a coordinate position of the image of the touch object acquired by the image sensing module to determine whether the touch object is moving or situated at a fixed point; the determining module comparing the first luminance and the second luminance when the touch object is situated at a fixed point, and when the first luminance is different from the second luminance, determining that the touch object is performing a fixed point rotation; and the control module executing a corresponding instruction according to the fixed point rotation.

According an embodiment of the present invention, the display panel comprises a display. surface; the image sensing module comprises a first image sensor, a second image sensor, an illuminating element, and a lens element; the first image sensor is disposed at an upper left portion of the display surface for sensing a first luminance, and a second luminance after the touch object rotates around a fixed point; the second image sensor is disposed at an upper right portion of the display surface for sensing a third luminance, and a fourth luminance after the touch object rotates around a fixed point; the lens element captures an image of any touch object on the display surface; and the illuminating element radiates a light towards the display surface to let the touch object generate the reflective image, thereby magnifying a difference between the reflective luminance and a background luminance of the touch object.

DETAILED DESCRIPTION OF THE PREFERRED EMBODIMENT

The advantages and innovative features of the invention will become more apparent from the following detailed description when taken in conjunction with the accompanying drawings.

Figure 1:
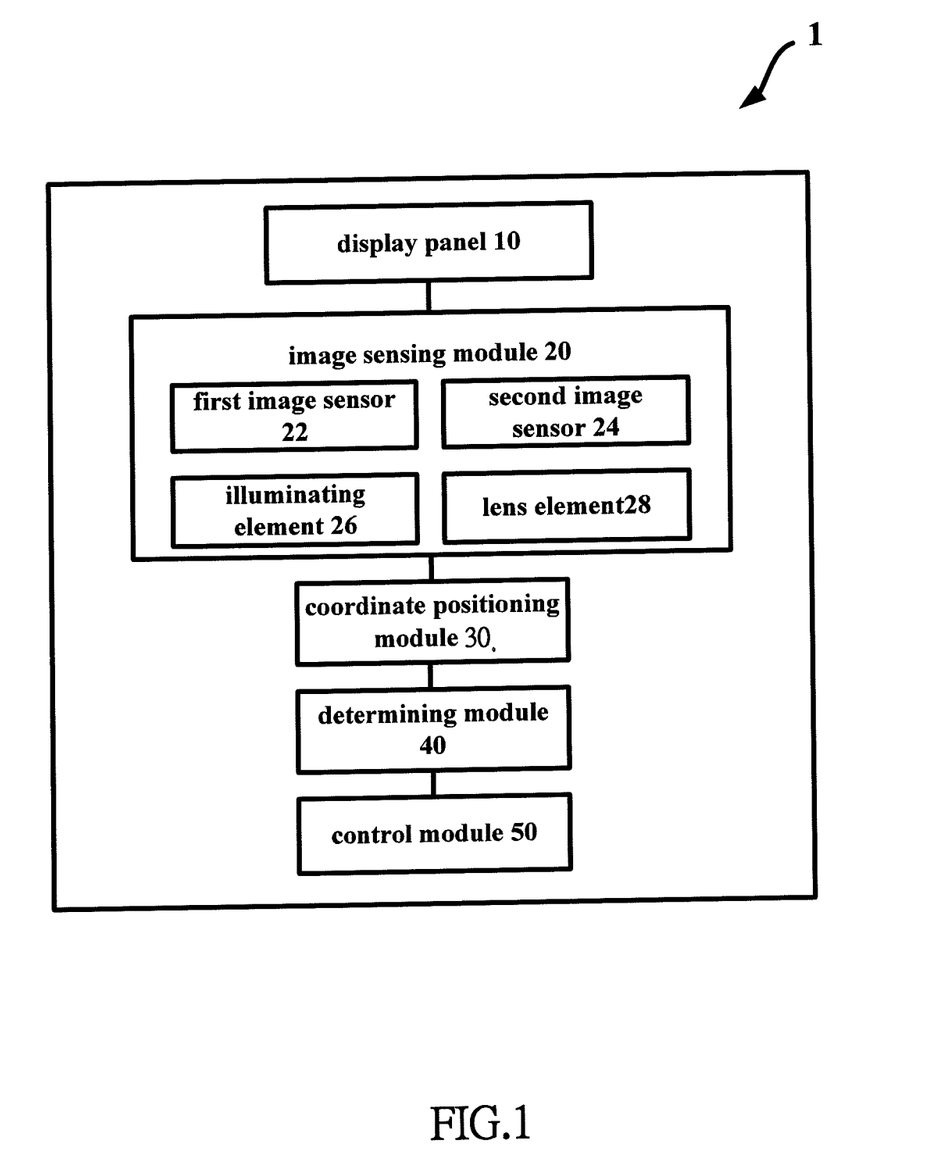
FIG. 1 illustrates a system structural view of a touch system of the present invention.
Figure 3:
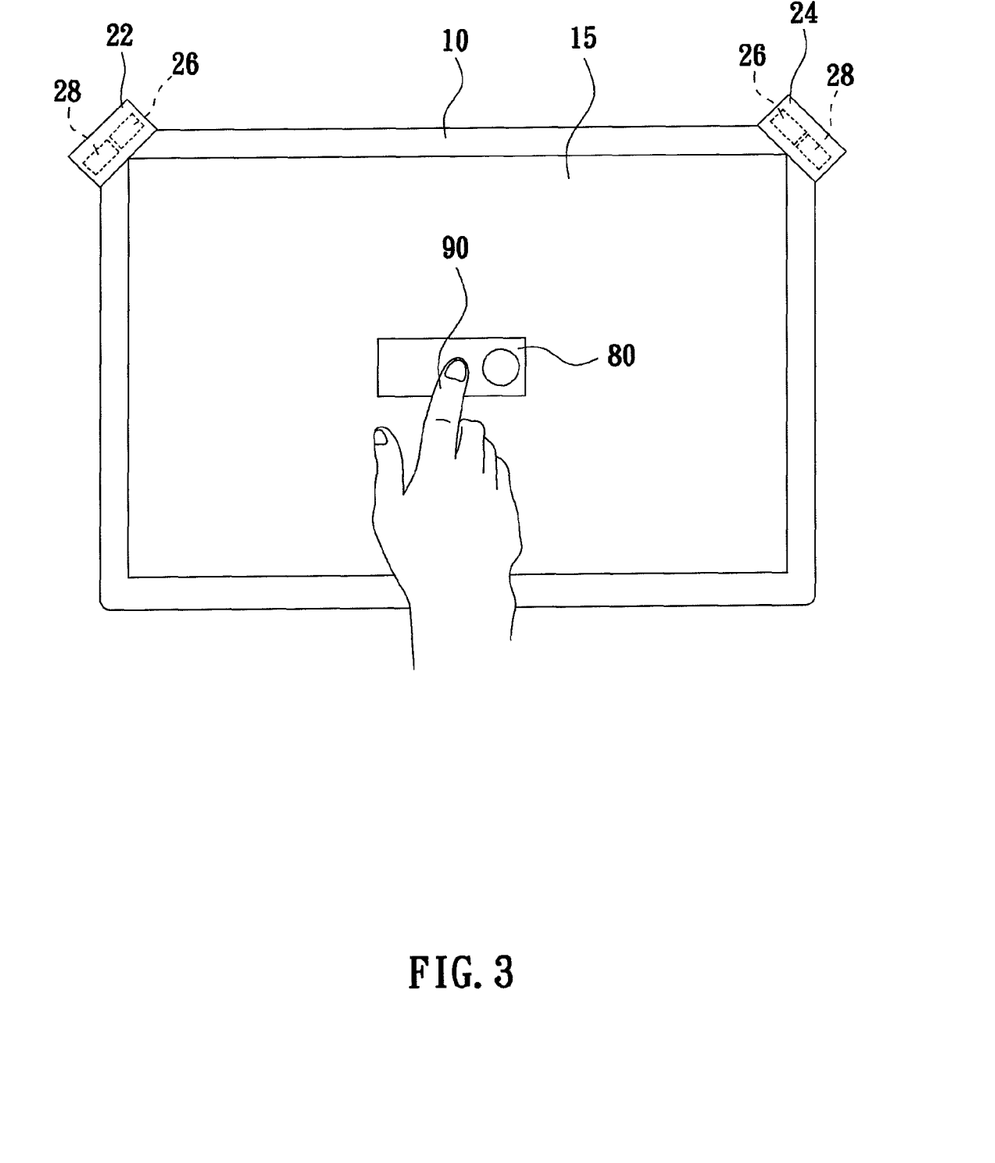
FIG. 3 illustrates an embodiment view of a touch object being on the display surface in the present invention.

Please refer to FIG. 1 and FIG. 3 for structural views of the touch system of the present invention. FIG. 1 illustrates a system structural view of the touch system of the present invention; FIG. 3 illustrates an operation view of the touch system of the present invention.

As shown in FIG. 1, in an embodiment of the present invention, the touch system 1 comprises a display panel 10, an image sensing module 20, a coordinate positioning module 30, a determining module 40, and a control module 50.

The display panel 10 comprises a display surface 15 (as shown in FIG. 3).

The image sensing module 20 is adjusted to have its plane of coordinates coincide with that of the display surface 15 of the display panel 10 to let, for example, a coordinate of a position touched by a finger coincide with that detected by the image sensing module 20. In an embodiment of the present invention, the image sensing module 20 comprises a first image sensor 22, a second image sensor 24, two illuminating elements 26, and two lens elements 28, wherein the two illuminating elements 26 and two lens elements 28 are disposed on the first image sensor 22 and the second image sensor 24 (as shown in FIG. 3) respectively; the lens elements 28 capture images of any touch object 90 on the display surface 15, and the illuminating elements 26 can radiate lights towards the display surface 15 to magnify a difference between the reflective luminance and the background luminance of the touch object 90. However, those who skilled in the art can easily know that the image sensing module 20 can use the lens element 28 to capture the image of the touch object 90 directly without the illuminating element 26, albeit there is little difference between the ambient light reflective luminance and the background luminance of the touch object 90. As shown in FIG. 3, in an embodiment of the present invention, the first image sensor 22 is disposed at the upper left portion of the display surface 15 for sensing a first luminance and a second luminance generated by the light-reflecting of the touch object 90 entering the sensing region on the display surface 15; the second image sensor 22 is disposed at the upper right portion of the display surface 15 for sensing a third luminance and a fourth luminance generated by the touch object 90 entering the sensing region on the display surface 15. In an embodiment of the present invention, the touch object 90 can be a human finger or any other object which can serve the purpose.

As shown in FIG. 1 and FIG. 3, the coordinate positioning module 30 uses the image feature recognition and triangulation techniques to calculate a coordinate position based on the images of the touch object 90 which are captured by the first image sensor 22 and the second image sensor 24; even if the touch object 90 is moving, the coordinate positioning module 30 can still detect and record a moving trajectory of the object based on the changing coordinates, thereby determining that the touch object 90 is moving or situated at a fixed point with the coordinate positioning module 30. Since the image feature recognition and triangulation techniques are known in art, they will not be further described for the sake of brevity.

The determining module 40 compares the first luminance and the second luminance of captured local images of the touch object 90, or compares the third luminance and the fourth luminance of captured local images of the touch object 90; when the first luminance is different from the second luminance or the third luminance is different from the fourth luminance result in variations in luminance, the determining module 40 determines that the touch object 90 is rotating and a direction of the rotation, wherein the captured local images can be fingernail images of a human finger.

The control module 50 executes a corresponding instruction according to a direction of the fixed-point rotation determined by the determining module 40.

Figure 2:
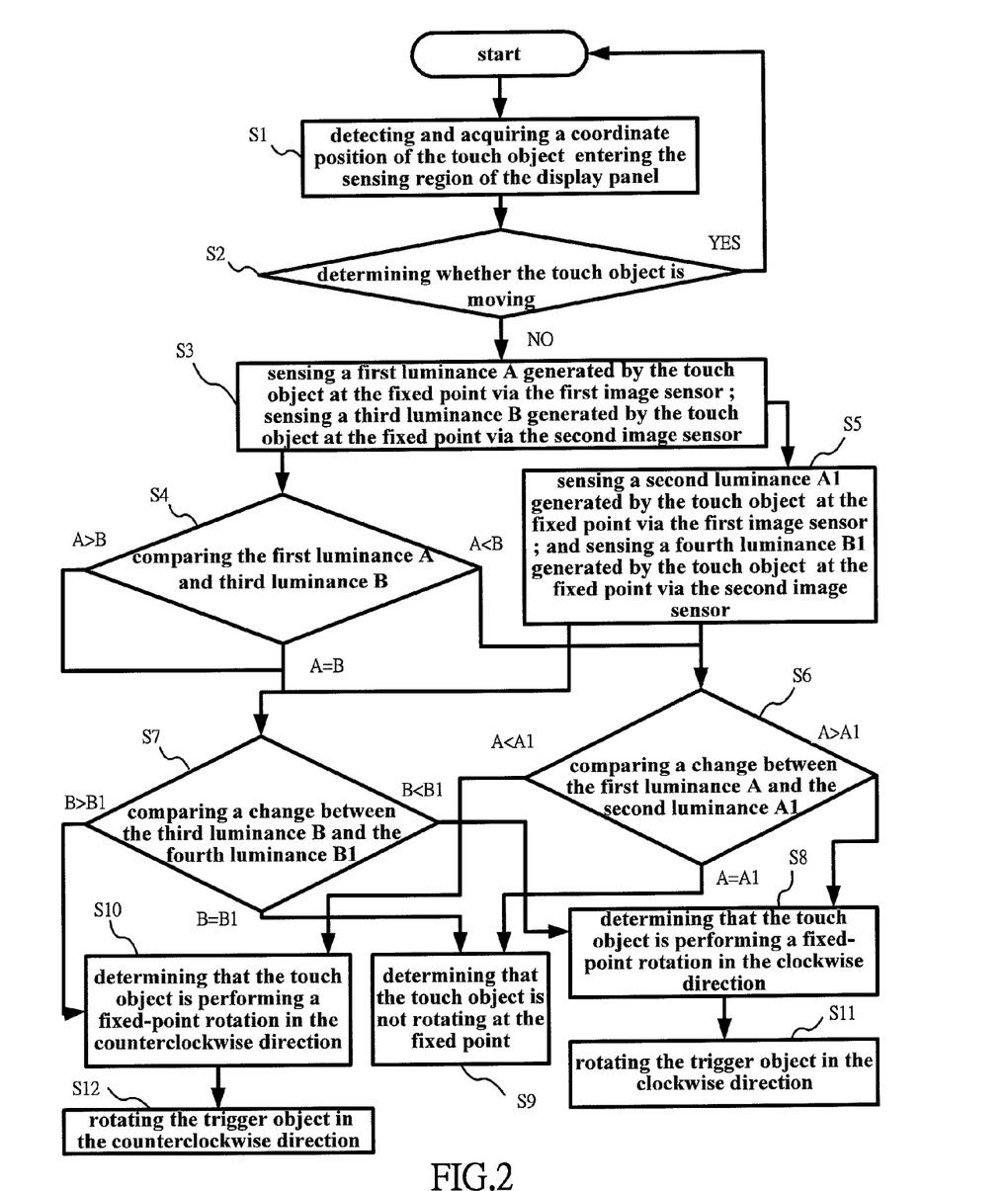
FIG. 2 illustrates a flowchart of a touch method of the present invention.
Figure 4:
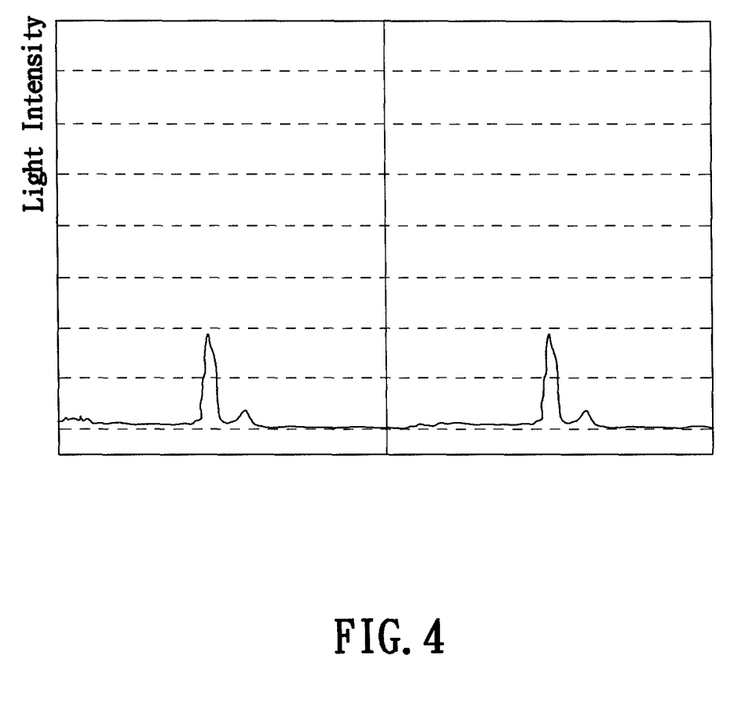
FIG. 4 illustrates a light wave diagram according to the embodiment of FIG. 3.
Figure 5:
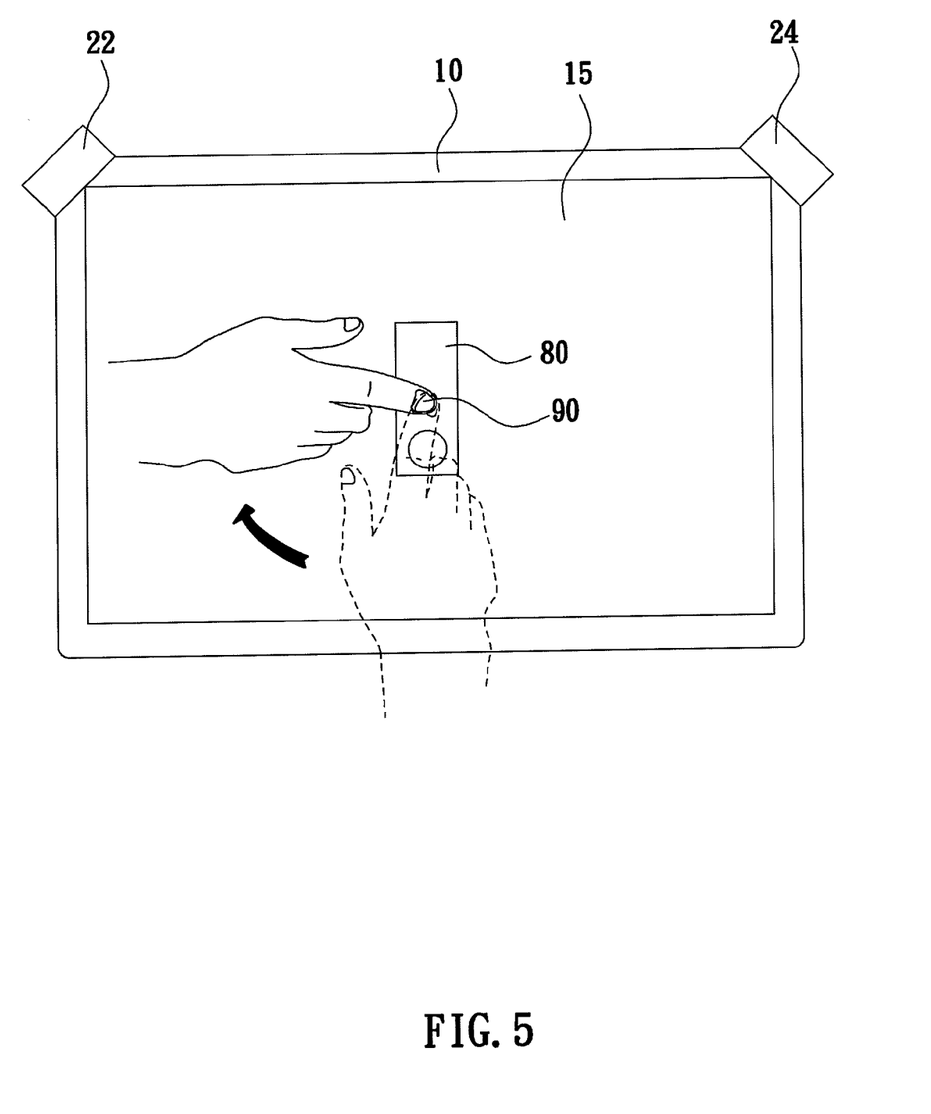
FIG. 5 illustrates a view of the touch object being operated to rotate in the clockwise direction.
Figure 6:
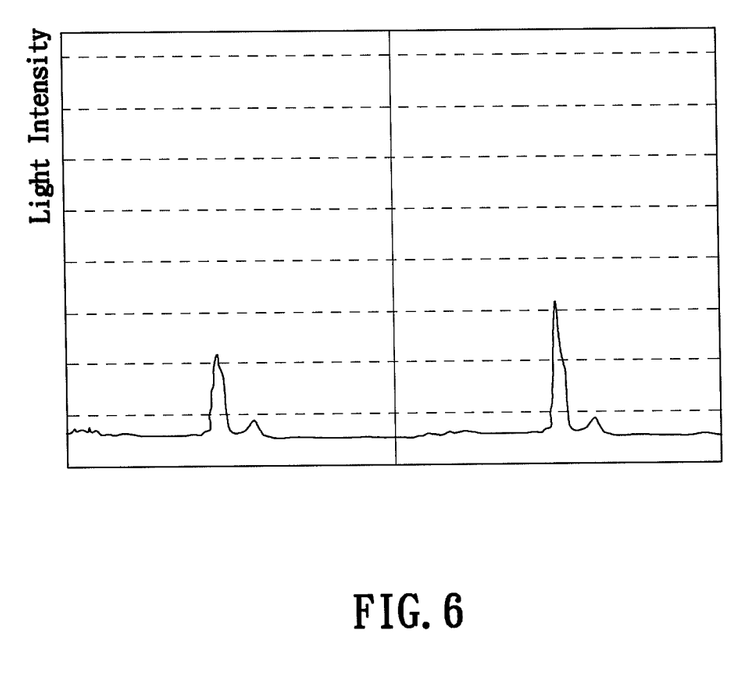
FIG. 6 illustrates a light wave diagram according to the state of FIG. 5.
Figure 7:
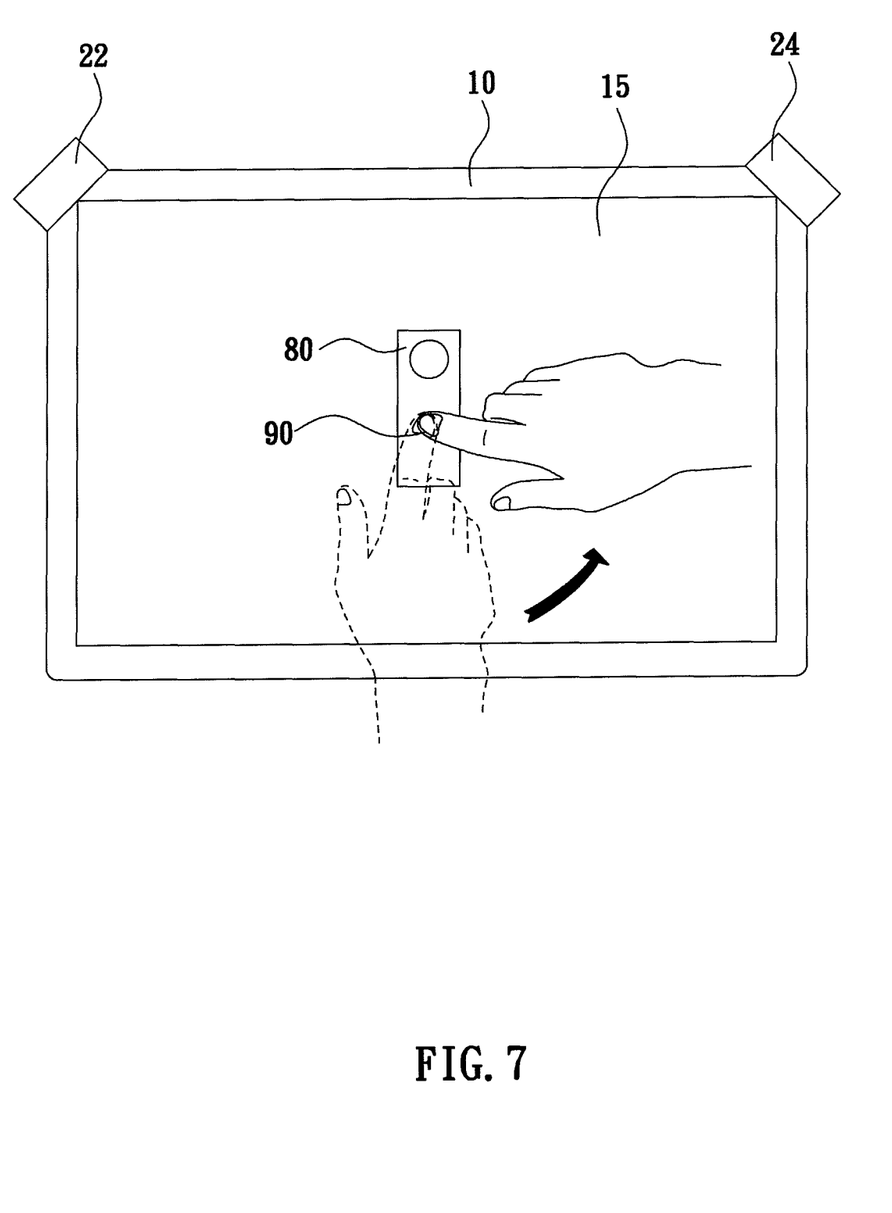
FIG. 7 illustrates a view of the touch object being operated to rotate in the counterclockwise direction.
Figure 8:
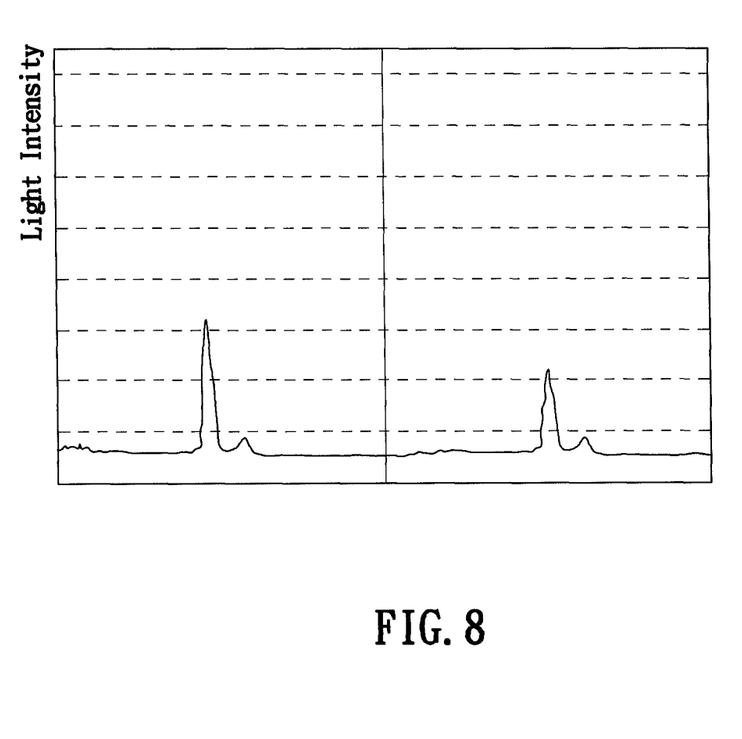
FIG. 8 illustrates a light wave diagram according to the state of FIG. 7.

Please refer to FIG. 2 to FIG. 8 for a flowchart and operation views of the touch method of fixed-point rotation gestures of the present invention. FIG. 2 illustrates a flowchart of a touch method of the present invention; FIG. 3 illustrates an operation view of the touch system of the present invention; FIG. 4 illustrates a light wave diagram according to the embodiment of FIG. 3; FIG. 5 illustrates a view of the touch object being operated to rotate in the clockwise direction; FIG. 6 illustrates a light wave diagram according to the state of FIG. 5; FIG. 7 illustrates a view of the touch object being operated to rotate in the counterclockwise direction; and FIG. 8 illustrates a light wave diagram according to the state of FIG. 7.

The touch method is for use in conjunction with the touch system 1 of the present invention. Detailed steps of the touch method will now be described with reference to FIG. 2 to FIG. 8.

First the process goes to S1: detecting and acquiring a coordinate position of the touch object 90 entering the sensing region of the display panel 10.

As shown in FIG. 2 and FIG. 3, in an embodiment of the present invention, the touch method acquires the coordinate position of the touch object 90 by continuously capturing images of the touch object 90 entering the display panel 10 via the first image sensor 22 and the second image sensor 24 and calculating the coordinate position of the touch object 90 by using the image feature recognition and triangulation techniques.

Then the process goes to S2: determining whether the touch object 90 is moving.

When the coordinate position of the touch object 90 is obtained in step S1, then it is determined whether the touch object 90 is moving by detecting a change in the coordinate position; in an embodiment of the present invention, if the touch object 90 is moving, then a dragging function is performed, and the touch method of the fixed-point rotation gesture is not executed; otherwise, if the touch object 90 is situated at the fixed point, then the process proceeds to the following steps.

The process goes to step S3: sensing a first luminance A generated by the touch object 90 at the fixed point via the first image sensor 22; sensing a third luminance B generated by the touch object 90 at the fixed point via the second image sensor 24.

When it is determined in step S2 that the touch object 90 is situated at the fixed point, then the first image sensor 22 senses the first luminance A generated by a part of the touch object 90 (such as a fingernail), and the second image sensor 24 senses the third luminance B generated by the part of the touch object 90 (such as the same fingernail).

As shown in FIG. 4, the left part of the figure illustrates a luminance distribution of the touch object 90 sensed by the first image sensor 22, and the right part of the figure illustrates a luminance distribution of the touch object 90 sensed by the second image sensor 24, wherein the wave peak refers to the brightest spot of the touch object 90 (which is a fingernail in this embodiment), which reflects the most light and also represents the first luminance A and the third luminance B. For example, as shown in FIG. 3, when the touch object 90 (such as the fingernail) is at the middle of the display surface 15 and is right above the display surface 15, the first and second image sensors 22, 24 sense the same level of luminance; therefore, the heights of the wave peaks are equal; that is, the first luminance A equals to the third luminance B. As shown in FIG. 5, when the touch object 90 rotates clockwise to head towards the second image sensor 24, the second image sensor 24 senses a higher reflective luminance, and so the wave peak becomes high (as shown in FIG. 6). On the contrary, under this circumstance, the fingernail turns away from the first image sensor 22, so the first image sensor 22 senses a lower reflective luminance, and so the wave peak becomes low.

Then the process goes to step S4: comparing the first luminance A and third luminance B.

After the step S2 is performed, the determining module 40 first compares the first luminance A and the third luminance B to decide the next move; at this stage, the determining module 40 does not directly determine a difference between the first luminance A and the second luminance A1 (as in step S6) or a difference between the third luminance B and the fourth luminance B1 (as in step S7). The reason is that, at the beginning, touch object 90 can make contact with the display surface 15 at any angle, which might affect judgment of the first image sensor 22 and the second image sensor 24. Therefore, by comparing the first luminance A and the third luminance B, it is determined that the touch object 90 turns towards the first image sensor 22 or the second image sensor 24. For example, as shown in FIG. 7, when the touch object 90 initially turns towards the first image sensor 22 when it is placed, suppose the touch object 90 faces right towards the first image sensor 22, so the first luminance A is at its highest (and so is the wave peak); therefore, whether the touch object 90 rotates in the clockwise direction or in the counterclockwise direction, the first image sensor 22 senses a lowering luminance level (and the wave peak is also lower), so it is not possible to determine the real direction of the rotation of the touch object 90 based on the difference of the luminance sensed by the first image sensor 22. Under these circumstances, the second image sensor 24 is used for sensing the difference of the luminance (as in step S7) to determine a direction of the fixed-point rotation of the touch object 90. Otherwise, as shown in FIG. 5, when the touch object 90 turns towards the second image sensor 24, the first image sensor 22 is used for sensing the difference of the luminance (as in step S6) to determine a direction of the fixed-point rotation of the touch object 90. It will be further described later.

The process goes to S5: sensing a second luminance A1 generated by the touch object 90 at the fixed point via the first image sensor 22; and sensing a fourth luminance B1 generated by the touch object 90 at the fixed point via the second image sensor 24.

After the step S4 is performed, after a time period T, a second luminance A1 generated by the touch object 90 at the fixed point is sensed via the first image sensor 22; and a fourth luminance B1 generated by the touch object 90 at the fixed point is sensed via the second image sensor 24, and then the determining module 40 can determine whether a difference of the luminance exists between the first luminance A (third luminance B) and the second luminance A1 (fourth luminance B1) after the time period T, and then determines whether the touch object 90 is rotating and a direction of the rotation.

Then the process proceeds to step S6: comparing a change between the first luminance A and the second luminance A1.

As shown in FIG. 2 and FIG. 5, after step S4 is performed and it is determined that the first luminance A is lower than the third luminance B (that is, the touch object 90 rotates towards the second image sensor 24), other than the second image sensor 24, which could lead to false judgment as described above, the first image sensor 22 is chosen for determining a difference between the first luminance A and the second luminance A1. After step S5 is performed, the first luminance A and the second luminance A1 are compared to determine a direction of the fixed-point rotation of the touch object 90.

Then the process goes to step S7: comparing a change between the third luminance B and the fourth luminance B1.

On the contrary, after step S4 is performed and it is determined that the first luminance A is higher than the third luminance B, then after step S5, the third luminance B is compared with the fourth luminance B1 (that is, the second image sensor 24 is chosen for determining a difference between the third luminance B and the fourth luminance B1). It is noted that when the first luminance A is equal to the third luminance B, the problem mentioned in step S4 is not going to happen; therefore, the touch method proceeds to step S7; similarly, it is viable to determine a difference between the first luminance A and the second luminance A1 to find out the direction of the fixed-point rotation. Therefore, the decision flow goes like:

when A<B, comparing A and A1;
when A>B, comparing B and B1;
when A=B, comparing A and A1 or comparing B and B1.

Then the process goes to step S8: determining that the touch object 90 is performing a fixed-point rotation in the clockwise direction.

As shown in FIG. 5, when the fixed point rotation is in the clockwise direction, the brightest spot (fingernail) of the touch object 90 will turn away from the first image sensor 22, so the sensed highest luminance will decrease; therefore, when the step S6 is performed and it is determined that the first luminance A is higher than the second luminance A1 (the luminance decreases), the determining module can determine that the touch object 90 is performing the fixed-point rotation in the clockwise direction with the highest wave peak starting to decrease (as shown in FIG. 6). In contrast, as the brightest spot of the touch object 90 is turning towards the second image sensor 24, the sensed luminance will increase; therefore, after the step S7 is performed and it is determined that the second luminance B1 is higher than the third luminance B (the luminance increases), the determining module can determine that the touch object 90 is performing the fixed-point rotation in the clockwise direction.

Then the process goes to step S9: determining that the touch object is not rotating at the fixed point.

As shown in FIG. 2, after step S6 or S7 is performed, if the first luminance A1 is equal to the second luminance A2, or the third luminance B is equal to the fourth luminance B1, then it is determined that the luminance sensed by the first image sensor 22 or the second image sensor 24 has not changed after a time period, so the determining module can determine that the touch object 90 is not rotating at the fixed point on the display surface 15.

Then the process proceeds to step S10: determining that the touch object 90 is performing a fixed-point rotation in the counterclockwise direction.

As shown in FIG. 7, when the fixed point rotation is in the counterclockwise direction, the brightest spot (fingernail) of the touch object 90 will turn towards the first image sensor 22, so the sensed highest luminance will increase; therefore, when the step S6 is performed and it is determined that the second luminance A1 is higher than the first luminance A (the luminance increases), then the determining module can determine that the touch object 90 is performing the fixed-point rotation in the counterclockwise direction with the highest wave peak starting to increase (as shown in FIG. 8). In contrast, as the brightest spot of the touch object 90 is turning away from the second image sensor 24, the sensed luminance will decrease; therefore, after the step S7 is performed and it is determined that the second luminance B1 is lower than the third luminance B (the luminance decreases), then the determining module can determine that the touch object 90 is performing the fixed-point rotation in the counterclockwise direction.

Then the process proceeds to step S11: rotating the trigger object 80 in the clockwise direction.

In an embodiment of the present invention, the touch method of the present invention can control the trigger object 80 according to fixed-point rotation gestures. As shown in FIG. 1 and FIG. 2, in step S8, when it is determined that the touch object 90 performs the fixed-point rotation in the clockwise direction, the control module 50 executes an operation instruction according to the fixed-point rotation to control the trigger object 80 shown on the display surface 15. As shown in FIG. 5, in an embodiment of the present invention, when the touch object 90 performs the fixed-point rotation in the clockwise direction, the touch system can determine that the touch object 90 performs the fixed-point rotation in the clockwise direction according to the above steps, and can control the trigger object 80 to rotate in the clockwise direction according to the fixed-point rotation.

Then the process proceeds to step S12: rotating the trigger object 80 in the counterclockwise direction.

As shown in FIG. 7, when the touch object 90 performs the fixed-point rotation in the counterclockwise direction, the touch system can determine that the touch object 90 performs the fixed-point rotation in the counterclockwise direction according to the above steps, and can control the trigger object 80 to rotate in the counterclockwise direction according to the fixed-point rotation.

It is noted that, in the embodiment of the present invention, the trigger object 80 can be a graphical user interface (GUI) element or an image object, such as a dial for adjusting a volume, a knob for adjusting a brightness of the display panel, or a photo. It is also noted that the touch method of the fixed-point rotation gesture can control the trigger object 80 to perform various kinds of actions according to fixed-point rotation gestures; for example, when the touch object 90 performs a fixed-point rotation in the clockwise direction, the trigger object 80 can be magnified; when the touch object 90 performs the fixed-point rotation in the counterclockwise direction, the trigger object 80 can be shrunk. Also, it is noted that the fixed-point rotation gestures can comprise clockwise or counterclockwise rotations in a single direction, and also multiple rotations with different directions, such as a clockwise rotation followed by a counterclockwise rotation in a single instruction. For example, the touch object 90 can perform a counterclockwise rotation, and then it can perform a clockwise rotation after a time period to enable the trigger object 80 to execute a "go to next page" instruction.

Furthermore, the present invention not only can control the GUI element or the image object which is shown on the display surface 15 and touched by the touch object 90 to rotate according to the direction of the fixed-point rotation, but the present invention can obtain a angular velocity of the touch object 90 by comparing a rate of luminance change between the first luminance A and the second luminance A1 and a rate of luminance change between the third luminance B and the fourth luminance B1 to control the rotation speed of the GUI element or the image object.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A touch method of a fixed-point rotation gesture for use in conjunction with a touch system to sense a fixed-point rotation touch gesture, wherein the touch system comprises a display panel and an image sensing module, and the display panel comprises a display surface, and the image sensing module comprises a first image sensor disposed at an upper left portion of the display surface for sensing a first luminance and a second luminance, the touch method comprising the following steps:

detecting and acquiring a coordinate position of a touch object entering a sensing region of the display panel;

determining whether the touch object is moving or situated at a fixed point according to the coordinate position;

sensing the first luminance generated by the touch object at the fixed point via the image sensing module, wherein the touch object can be a human finger and the first luminance refers to a reflective luminance of a fingernail of the human finger;

sensing the second luminance generated by the touch object at the fixed point via the image sensing module after a time period, wherein the second luminance refers to another reflective luminance of the fingernail of the human finger;

comparing the first luminance with the second luminance; if the first luminance is different from the second luminance, then determining that the touch object is performing a fixed point rotation, wherein if the second luminance is higher than the first luminance, determining that the touch object is performing the fixed-point rotation in a counterclockwise direction on the display surface; and if the second luminance is lower than the first luminance, determining that the touch object is performing the fixed-point rotation in a clockwise direction on the display surface; and executing a corresponding instruction according to the fixed point rotation.

2. The touch method as claimed in claim 1, wherein the image sensing module further comprises a second image sensor disposed at an upper right portion of the display surface, and the touch method comprises the following steps: when the first luminance is sensed via the first image sensor, sensing a third luminance generated by the touch object at the fixed point via the second image sensing module; when the second luminance is sensed via the first image sensor, sensing a fourth luminance generated by the touch object at the fixed point via the second image sensor; comparing the second luminance and the first luminance, and comparing the third luminance and the fourth luminance, thereby determining the direction of the fixed-point rotation of the touch object on the display surface.

3. The touch method as claimed in claim 2, comprising the following steps:

comparing the first and the third luminance; if the first luminance is lower than the third luminance, then comparing the second and the first luminance to determine a direction of the fixed point rotation; if the second luminance is lower than the first luminance, then determining that the fixed-point rotation is performed in the clockwise direction; and if the second luminance is higher than the first luminance, then determining that the fixed-point rotation is performed in the counterclockwise direction.

4. The touch method as claimed in claim 2, comprising the following steps:

comparing the first and the third luminance; if the first luminance is higher than the third luminance, then comparing the fourth and the third luminance to determine a direction of the fixed point rotation; if the fourth luminance is lower than the third luminance, then determining that the fixed-point rotation is performed in the counterclockwise direction; and if the fourth luminance is higher than the third luminance, then determining that the fixed-point rotation is performed in the clockwise direction.

5. The touch method as claimed in claim 1, wherein the instruction is used for controlling a trigger object shown on the display surface which is touched by the touch object; when the touch object is performing a fixed-point rotation in a clockwise direction on the display surface, the trigger object rotates in the clockwise direction; when the touch object is performing the fixed-point rotation in a counterclockwise direction, the trigger object rotates in the counterclockwise direction.

6. The touch method as claimed in claim 1, wherein the instruction is used for controlling a trigger object shown on the display surface and touched by the touch object, and the trigger object can be a graphical user interface element or an image element.

7. The touch method as claimed in claim 6, wherein the touch method comprises the following steps:

determining a rotating angular velocity of the touch object according to a rate of luminance change, and the rotating angular velocity is used for controlling a rotating speed of the graphical user interface element or the image element.

8. A touch system for sensing a fixed-point rotate touch gesture, comprising:

a display panel, comprising a display surface;

an image sensing module, comprising a first image sensor disposed at an upper left portion of the display surface for detecting whether a touch object enters a sensing region of the display panel and acquiring a reflective image of the touch object, and the first image sensor obtaining a first luminance and then a second luminance respectively before and after a period of time, wherein the touch object can be a human finger, and the reflective image refers to the reflective image of a fingernail of the human finger;

a coordinate positioning module for acquiring, on the display surface, a coordinate position of the reflective image of the touch object acquired by the image sensing module to determine whether the touch object is moving or situated at a fixed point;

a determining module for comparing the first luminance with the second luminance when the touch object is situated at a fixed point, and when the first luminance is different from the second luminance, determining that the touch object is performing a fixed point rotation, wherein if the second luminance is higher than the first luminance, then the determining module determines that the touch object is performing the fixed-point rotation in a counterclockwise direction on the display surface; if the second luminance is lower than the first luminance, then the determining module determines that the touch object is performing the fixed-point rotation in a clockwise direction on the display surface; and a control module for executing a corresponding instruction according to the fixed point rotation.

9. The touch system as claimed in claim 8, wherein the image sensing module further comprises a second image sensor disposed at an upper right portion of the display surface for sensing a third luminance and a fourth luminance generated by the touch object at the fixed point; if the fourth luminance is lower than the third luminance, then the determining module determines that the touch object is performing the fixed-point rotation in a counterclockwise direction on the display surface; if the fourth luminance is higher than the third luminance, then the determining module determines that the touch object is performing the fixed-point rotation in a clockwise direction on the display surface.

10. The touch system as claimed in claim 8, wherein the image sensing module can comprise an illuminating element and a lens element, the lens element captures an image of the touch object on the display surface, and the illuminating element radiates a light towards the display surface to let the touch object generate the reflective image.

11. The touch system as claimed in claim 8, wherein the instruction is used for controlling a trigger object shown on the display surface and touched by the touch object, and the trigger object can be a graphical user interface element or an image element.

12. The touch system as claimed in claim 11, wherein the determining module can determine and obtain an rotating angular velocity of the touch object according to a rate of luminance change, such that the control module controls a rotating speed of the graphical user interface element or the image element according to the rotating angular velocity.

* * * * *